United States Patent
Ciu et al.

(10) Patent No.: US 9,774,620 B2
(45) Date of Patent: Sep. 26, 2017

(54) AUTOMATIC CODE AND DATA SEPARATION OF WEB APPLICATION

(71) Applicant: Microsoft Technology Licensing, LLC, Redmond, WA (US)

(72) Inventors: Weidong Ciu, Redmond, WA (US); Adam Loe Doupe, Goleta, CA (US); Mariusz H. Jakubowski, Bellevue, WA (US); Marcus Peinado, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 4 days.

(21) Appl. No.: 13/921,169

(22) Filed: Jun. 18, 2013

(65) Prior Publication Data
US 2014/0373087 A1 Dec. 18, 2014

(51) Int. Cl.
H04L 29/06 (2006.01)

(52) U.S. Cl.
CPC .......... *H04L 63/145* (2013.01); *H04L 63/168* (2013.01)

(58) Field of Classification Search
None
See application file for complete search history.

(56) References Cited

U.S. PATENT DOCUMENTS

| | | | |
|---|---|---|---|
| 6,567,918 B1 | 5/2003 | Flynn et al. | |
| 8,578,499 B1* | 11/2013 | Zhu et al. | 726/25 |
| 2003/0233640 A1* | 12/2003 | Reynaud | 717/154 |
| 2007/0156871 A1 | 7/2007 | Braun et al. | |
| 2009/0183227 A1* | 7/2009 | Isaacs et al. | 726/1 |
| 2010/0257603 A1* | 10/2010 | Chander et al. | 726/22 |
| 2012/0023395 A1* | 1/2012 | Pieczul | G06F 21/51 715/234 |
| 2012/0079057 A1* | 3/2012 | Fainberg et al. | 709/214 |
| 2012/0167209 A1* | 6/2012 | Molnar | G06F 21/54 726/22 |
| 2013/0067570 A1* | 3/2013 | Risney, Jr. | G06F 21/566 726/22 |
| 2013/0086247 A1* | 4/2013 | Burckart et al. | 709/224 |
| 2013/0086255 A1* | 4/2013 | Burckart et al. | 709/224 |
| 2013/0179978 A1* | 7/2013 | Pistoia et al. | 726/25 |
| 2013/0254855 A1* | 9/2013 | Walters et al. | 726/5 |
| 2014/0052998 A1* | 2/2014 | Bloom | G06F 21/554 713/189 |
| 2014/0150099 A1* | 5/2014 | Yuan et al. | 726/22 |
| 2014/0380477 A1* | 12/2014 | Li et al. | 726/23 |
| 2015/0074188 A1* | 3/2015 | Burckart | H04L 67/2823 709/203 |

(Continued)

OTHER PUBLICATIONS

Y. Minamide. Static approximation of dynamically generated web pages. In Proceedings of the International Conference on the World Wide Web, pp. 432-441, 2005.*

(Continued)

*Primary Examiner* — Michael R Vaughan (57) ABSTRACT

Aspects of the subject disclosure are directed towards detecting instances within a web application where code and data are not separated, e.g., inline code in the application. One or more implementations automatically transform the web application into a transformed version where code and data are clearly separated, e.g., inline code is moved into external files. The transformation protects against a large class of cross-site scripting attacks.

20 Claims, 7 Drawing Sheets

(56) References Cited

U.S. PATENT DOCUMENTS

| | | | | |
|---|---|---|---|---|
| 2016/0006754 | A1* | 1/2016 | Woodward | G06F 21/53 726/23 |
| 2016/0342793 | A1* | 11/2016 | Hidayat | G06F 21/57 |

OTHER PUBLICATIONS

D. Balzarotti, M. Cova, V. Felmetsger, N. Jovanovic, E. Kirda, C. Kruegel, and G. Vigna. Saner: Composing Static and Dynamic Analysis to Validate Sanitization in Web Applications. In Proceedings of the IEEE Symposium on Security and Privacy, Oakland, CA, May 2008.*

Sun, F., Xu, L., and Su, Z. Static detection of access control vulnerabilities in web applications. In Proceedings of the 20th USENIX conference on Security (Berkeley, CA, USA, 2011), SEC'11, USENIX Association, pp. 11-11.*

Barth, et al., "Protecting Browsers from Extension Vulnerabilities", In Electrical Engineering and Computer Sciences University of California at Berkeley, Technical Report No. UCB/EECS-2009-185, Dec. 18, 2009, 14 pages.

Anupam, et al., "Security of Web Browser Scripting Languages: Vulnerabilities, Attacks, and Remedies", In Proceedings of the 7th USENIX Security Symposium, Jan. 26, 1998, 14 pages.

Anupam, et al., "Secure Web Scripting", In IEEE Internet Computing, vol. 2, Issue 6, Nov. 1998, 10 pages.

Phung, et al., "Lightweight Self-Protecting JavaScript", In Proceedings of the 4th International Symposium on Information, Computer, and Communications Security, Mar. 10, 2009, 14 pages.

Dhawan, et al., "Analyzing Information Flow in JavaScript-based Browser Extensions", In Proceedings of Annual Computer Security Applications Conference, Dec. 7, 2009, 10 pages.

Martin, et al., "Deanonymizing Users of the Safe Web Anonymizing Service", In Proceedings of the 11th USENIX Security Symposium, Feb. 11, 2002, 24 pages.

Akhawe, et al., "Privilege Separation in HTML5 Applications", In Proceedings of the 21st USENIX Conference on Security Symposium, Aug. 8, 2012, 16 pages.

Athanasopoulos, et al., "Code-Injection Attacks in Browsers Supporting Policies", In Proceedings of the IEEE Web 2.0 Security and Privacy Workshop, May 2009, 4 pages.

Balzarotti, et al., "Saner: Composing Static and Dynamic Analysis to Validate Sanitization in Web Applications", In IEEE Symposium on Security and Privacy, May 18, 2008, 15 pages.

Barth, et al., "Robust Defenses for Cross-Site Request Forgery", In Proceedings of the 15th ACM Conference on Computer and Communications Security, Oct. 27, 2008, 13 pages.

Bisht, et al., "XSSGUARD: Precise Dynamic Prevention of Cross-Site Scripting Attacks", In Proceedings of the 5th International Conference on Detection of Intrusions and Malware, and Vulnerability Assessment, Jul. 10, 2008, 20 pages.

"Bogengine.Net—An Innovative Open Source Blogging Platform", Retrieved on: Apr. 30, 2013, 2 pages, Available at: http://www.dotnetblogengine.net/.

Bojinov, et al., "XCS: Cross-Channel Scripting and its Impact on Web Applications", In Proceedings of the 16th ACM Conference on Computer and Communications Security, Nov. 9, 2009, 12 pages.

"BugTracker.Net—Free Bug Tracking", Retrieved on: Apr. 30, 2013, 3 pages, Available at: http://ifdefined.com/bugtrackernet.html.

Carbone, et al., "Mapping Kernel Objects to Enable Systematic Integrity Checking", In Proceedings of the 16th ACM Conference on Computer and Communications Security, Nov. 9, 2009, 11 pages.

Alvarez, et al., "Chronozoom", Retrieved on: Apr. 30, 2013, 1 page, Available at: http://chronozoom.cloudapp.net/firstgeneration.aspx.

"CVE Details", Retrieved on: Apr. 30, 2013, 2 pages, Available at: http://www.cvedetails.com/vulnerabilities-by-types.php.

"Firehost: Cross-Site Scripting Attacks Up 160% in Final Quarter of 2012, Reveals Fire-Host", Published on: Jan. 29, 2013, 8 pages, Available at: http://www.firehost.com/company/newsroom/web-application-attack-report-fourth-quarter-2012.

"Google", Retrieved on: Apr. 30, 2013, 4 pages, Available at: http://code.google.com/p/ctemplate/.

Gundy, et al., "Noncespaces: Using Randomization to Enforce Information Flow Tracking and Thwart Cross-Site Scripting Attacks", In Proceedings of the Network and Distributed System Security Symposium, Feb. 8, 2009, 13 pages.

Hallaraker, et al., "Detecting Malicious JavaScript Code in Mozilla", In Proceedings of 10th IEEE International Conference on Engineering of Complex Computer Systems, Jun. 16, 2005, 10 pages.

Heiderich, et al., "Scriptless Attacks: Stealing the Pie Without Touching the Sill", In Proceedings of the ACM Conference on Computer and Communications Security, Oct. 16, 2012, 12 pages.

Hooimeijer, et al., "Fast and Precise Sanitizer Analysis with BEK", In SEC Proceedings of the 20th USENIX Conference on Security, Aug. 2011, 16 pages.

Jim, et al., "Defeating Script Injection Attacks with Browser-Enforced Embedded Policies", In Proceedings of the 16th International Conference on World Wide Web, May 8, 2007, 10 pages.

Johns, et al., "SMask: Preventing Injection Attacks in Web Applications by Approximating Automatic Data/Code Separation", In Proceedings of the ACM Symposium on Applied Computing, Mar. 11, 2007, 8 pages.

Jovanovic, et al., "Precise Alias Analysis for Static Detection of Web Application Vulnerabilities", In Proceedings of the Workshop on Programming Languages and Analysis for Security, Jun. 10, 2006, 10 pages.

Kirda, et al., "Noxes: A Client-Side Solution for Mitigating Cross-Site Scripting Attacks", In Proceedings of the ACM Symposium on Applied Computing, Apr. 23, 2006, 8 pages.

Klein, Amit, "DOM Based Cross Site Scripting or XSS of the Third Kind", Retrieved on: Apr. 30, 2013, 8 pages, Available at: http://www.webappsec.org/projects/articles/071105.shtml.

Livshits, et al., "Using Web Application Construction Frameworks to Protect Against Code Injection Attacks", In Proceedings of the Workshop on Programming Languages and Analysis for Security, Jun. 14, 2007, 9 pages.

Livshits, et al., "Finding Security Vulnerabilities in Java Applications with Static Analysis", In Proceedings of the 14th Conference on USENIX Security Symposium, vol. 14, Jul. 31, 2005, 16 pages.

Louw, et al., "Blueprint: Robust Prevention of Cross-Site Scripting Attacks for Existing Browsers", In Proceedings of the 30th IEEE Symposium on Security and Privacy, May 17, 2009, 16 pages.

Martin, et al., "Automatic Generation of XSS and SQL Injection Attacks with Goal-Directed Model Checking", In Proceedings of the 17th Conference on Security Symposium, Jul. 2008, 13 pages.

Meyerovich, et al., "ConScript: Specifying and Enforcing Fine-Grained Security Policies for Javascript in the Browser", In Proceedings of the IEEE Symposium on Security and Privacy, May 16, 2010, 16 pages.

"asp.net", Retrieved on: Apr. 30, 2013, 1 page, Available at: http://www.asp.net/.

"Common Compiler Infrastructure", Retrieved on: Apr. 30, 2013, 1 page, Available at: http://research.microsoft.com/en-us/projects/cci/.

Nadji, et al., "Document Structure Integrity: A Robust Basis for Cross-Site Scripting Defense", In Proceedings of the Network and Distributed System Security Symposium, Feb. 8, 2009, 20 pages.

Nguyen-Tuong, et al., "Automatically Hardening Web Applications Using Precise Tainting", In Proceedings of 20th IFIP International Information Security Conference, May 30, 2005, 12 pages.

Pietraszek, et al., "Defending Against Injection Attacks Through Context-Sensitive String Evaluation", In Proceedings of the 8th International Conference on Recent Advances in Intrusion Detection, Sep. 7, 2005, 26 pages.

Samuel, et al., "Context-Sensitive Auto-Sanitization in Web Templating Languages Using Type Qualifiers", In Proceedings of the 18th ACM Conference on Computer and Communications Security, Oct. 17, 2011, 14 pages.

(56) References Cited

OTHER PUBLICATIONS

Saxena, et al., "A Symbolic Execution Framework for JavaScript", In IEEE Symposium on Security and Privacy, May 16, 2010, 16 pages.

Saxena, et al., "FLAX: Systematic Discovery of Clientside Validation Vulnerabilities in Rich Web Applications", In Proceedings of the Network and Distributed System Security Symposium, Feb. 28, 2010, 17 pages.

Saxena, et al., "SCRIPTGARD: Automatic Context-Sensitive Sanitization for Large-Scale Legacy Web Applications", In Proceedings of the 18th ACM Conference on Computer and Communications Security, Oct. 17, 2011, 14 pages.

Stamm, et al., "Reining in the Web with Content Security Policy", In Proceedings of the 19th International Conference on World Wide Web, Apr. 26, 2010, 9 pages.

Su, et al., "The Essence of Command Injection Attacks in Web Applications", In Proceeding of Conference Record of the 33rd ACM SIGPLAN-SIGACT Symposium on Principles of Programming Languages, Jan. 11, 2006, 11 pages.

Tripp, et al., "Taj: Effective Taint Analysis of Web Applications", In Proceedings of the ACM SIGPLAN Conference on Programming Language Design and Implementation, Jun. 15, 2009, 11 pages.

Vogt, et al., "Cross-Site Scripting Prevention with Dynamic Data Tainting and Static Analysis", In Proceedings of the Network and Distributed System Security Symposium, Feb. 28, 2007, 12 pages.

Wassermann, et al., "Sound and Precise Analysis of Web Applications for Injection Vulnerabilities", In Proceedings of the ACM SIGPLAN Conference on Programming Language Design and Implementation, Jun. 11, 2007, 10 pages.

Weinberger, et al., "Towards Client-Side HTML Security Policies", In Proceedings of the 6th USENIX Conference on Hot Topics in Security, Aug. 8, 2011, 6 pages.

Weinberger, et al., "A Systematic Analysis of XSS Sanitization in Web Application Frameworks", In Proceedings of the 16th European Conference on Research in Computer Security, Sep. 12, 2011, 20 pages.

Xie, et al., "Static Detection of Security Vulnerabilities in Scripting Languages", In Proceedings of the 15th Conference on USENIX Security Symposium, vol. 15, Jul. 31, 2006, 14 pages.

* cited by examiner

AUTOMATIC CODE AND DATA SEPARATION OF WEB APPLICATION

BACKGROUND

Many modern web applications are complex programs. Such programs are not limited to server-side code that runs on the web server. Instead, web applications may include a significant amount of (script) code that is sent to and executed on the client, whereby such client-side components provide for a rich and fast user experience.

Client-side components also often contain parts of the application logic, and typically communicate with the server-side component through asynchronous JavaScript® calls. As a result, attackers may find entry points that can be exploited to inject unwanted parts into the script output.

Cross-site scripting (XSS) flaws are one of the most common types of vulnerabilities that are leveraged by attackers to compromise a web application and its users. A large set of cross-site scripting vulnerabilities originate from the browser's confusion between data and code. That is, data that is provided as input to web applications by an attacker is actually code that is later sent to a clients' browser, where it is then interpreted as code and executed. It is difficult if not impossible to force developers to design web applications in a way that clearly separates code and data.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards statically analyzing a web application to detect when inline code is present, including performing static data flow analysis of the web application to approximate the output of the web application, and parsing data representative of the approximated output to identify any inline code.

In one or more aspects, a static tool is configured to detect inline code in a web application. The tool includes an algorithm having an approximation phase configured to determine approximated HTML output, a detection and extraction phase configured to detect and extract inline code from data corresponding to the approximated HTML output, and a rewriting phase configured to transform the web application into a transformed application that writes extracted inline code to external code files and references them in the output HTML page.

One or more aspects are directed towards inputting a web application containing or generating inline code and parsing the web application to detect the inline code or its generation. The web application is transformed into a transformed web application in which the inline code is moved to external files.

Other aspects and advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards detecting inline code in a web application. This facilitates securing web applications based upon an algorithm that automatically translates a web application, in which code and data may be intertwined, into a version where code and data are clearly separated. As a result of this transformation, the transformed application and its users are protected against a large class of cross-site scripting attacks. The code and data separation can be efficiently enforced at run-time via a Content Security Policy (CSP) enforcement mechanism, for example.

In one or more aspects, a given web application is statically transformed so that the new version preserves the application semantics but outputs web pages in which the inline (e.g., JavaScript®) code is moved to external files. To this end, a transformation tool statically determines a conservative approximation of the HTML output of the web page, extracts inline code from the approximated HTML output, and rewrites the application so that the inline codes is moved to external files. In this way, the browser can be instructed to not execute anything in HTML data, yet the transformed application continues to execute properly because the (formerly inline) code is executed via the files.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and web-related security in general.

Figure 1:
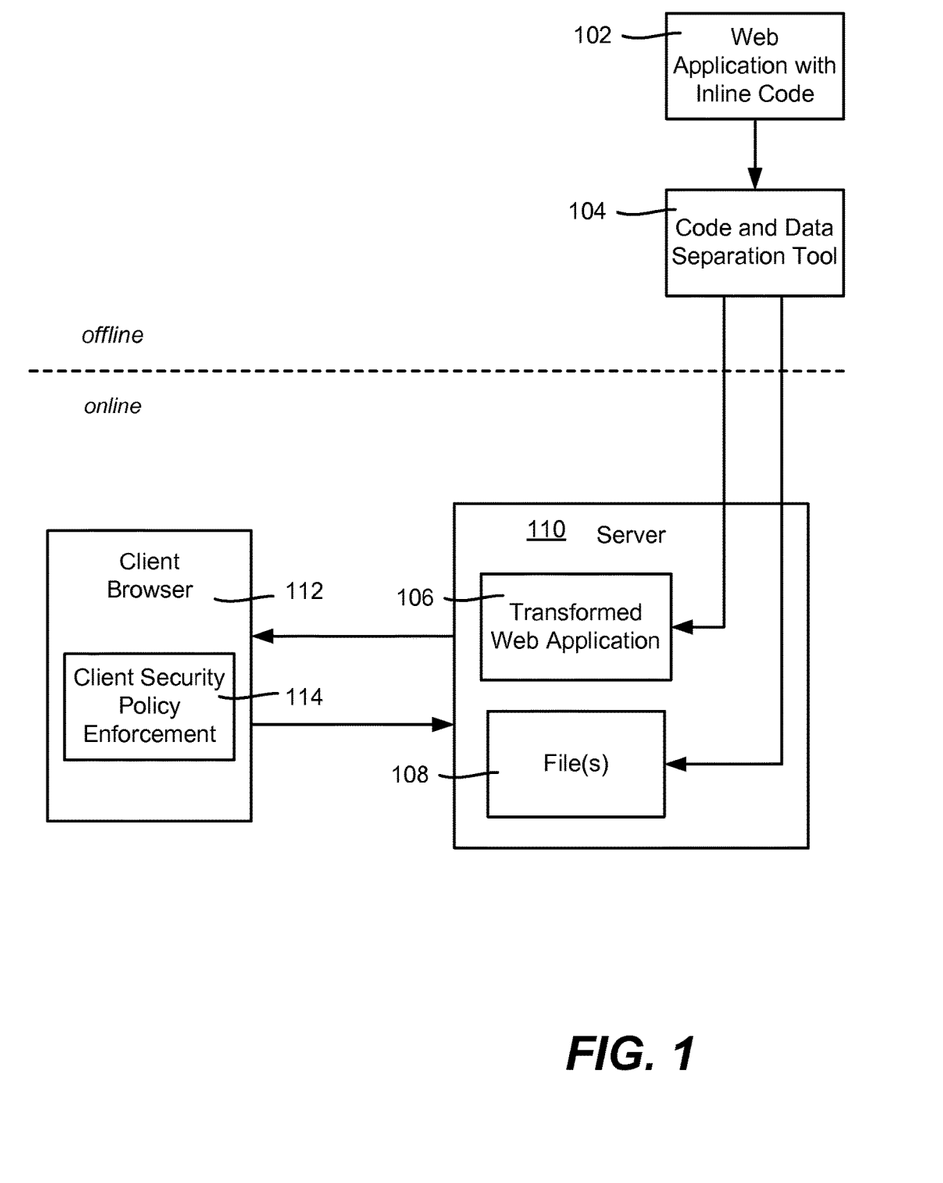
FIG. 1 is a block diagram representing example components for processing a web application to remove inline code, according to one or more example implementations.

FIG. 1 shows a generalized block diagram in which a web application 102, (possibly) containing one or more cross-site scripting flaws in the form of inline code, is processed by a code and data separation tool 104 as described herein. This processing is generally performed offline, e.g., on legacy web applications (or possibly as part of the development of new web applications). As described herein, the result is a transformed web application 106 in which any inline code has been removed and moved into a set of one or more files 108.

The transformed web application 106 and files 108 are served via a web server 110 to a client browser 112. The client browser 112 includes or is coupled to a client security policy enforcement mechanism 114, an example of which is CSP or based upon CSP. The browser 112/client security policy enforcement mechanism 114 prevents data from being executed as code; that is, client security policy enforcement mechanism 114 provides a mechanism for web browsers to enforce the separation between code and data as specified by web applications, which in this example instructs the client not to execute any inline code. Because the code has been separated from the data and placed into the one or more external files 108, the web application 106 will execute properly under this policy.

Thus, the server 110 sends a security policy that instructs the browser 112 to not execute any inline code. Instead, any code to be executed can only come from a server-specified set of files. Thus, an attacker who enters malicious code in the data of a web page that gets returned to the server 108 will not have that inline code executed by the client browser 112, because the browser 112 will only execute script from the specified files.

However, legacy web applications that include non-malicious inline code will not have their inline code executed, and thus will be unable to function properly with this security policy. Only legacy web applications having inline code that are transformed into new applications with code and data separated will run correctly.

Described herein is automatically transforming such legacy applications into transformed applications, which will properly function on client browsers that do not execute inline code. Note that in addition to transforming legacy files, the code and data separation tool 104 described herein alternatively may be used to evaluate (and if desired transform if needed) a new web application to ensure that any newly developed web application does not have such flaws.

Turning to the web application 102 with flaws, modern web applications include both server-side and client-side code. Upon receiving an HTTP request, the server-side code, which is written in a server-side language, such as PHP or ASP.NET, dynamically generates a web page as a response, based on the user input in the request and/or data in a backend database. The client-side code, which is usually written in JavaScript®, can be either inline in the web page or external as a standalone JavaScript® file. In legacy web applications, (and even during development of a new web application), it is common to embed inline JavaScript® code in the returned web page, such as for better performance in slow networks. This is because it saves the round trip time for downloading the additional standalone JavaScript® file or files.

Cross-site scripting vulnerabilities allow an attacker to inject malicious scripts into web pages to execute in the client-side browser, as if they were generated by the trusted web site. If the vulnerability allows the attacker to store malicious JavaScript® on the server (e.g., using the contents of a message posted on a newsgroup), the vulnerability is traditionally referred to as "stored" or "persistent XSS." When the malicious code is included in the request and involuntarily reflected to the user (copied into the response) by the server, the vulnerability is called "reflected XSS."

The root cause for server-side cross-site scripting vulnerabilities is that the code (i.e., the client-side script) and the data (i.e., the HTML content) are mixed together in a web page. By crafting some malicious input that will be included into the returned web page by the server-side code, an attacker can trick the browser into confusing the attacker's data as the server's JavaScript® code. In the context of web applications, to solve the vulnerabilities caused by mixing code and data together in web pages, the code and data in web pages created by web applications need to be separated.

Content security policy (CSP) is a mechanism for mitigating a broad class of content injection vulnerabilities in web applications. Content security policy is a declarative policy that allows a web application to inform the client-side browser 112, via an HTTP header, about the sources from which the application expects to load resources such as JavaScript® code, e.g., a "whitelist" of files (which may be any files from the server). A web browser 112 that implements the support for client security policy enforcement mechanism 114 can enforce the security policy declared by the web application.

The code and data separation tool 104 automatically processes legacy applications, e.g., to apply Content Security Policy to any existing legacy web application. This is difficult to do manually, as the authors of the web application have to modify the server-side code to clearly identify which resources (e.g., which JavaScript® programs) are used by a web page. Moreover, these scripts have to be separated from the web page.

Described herein is solving the problem of automatically transforming existing web applications so that the code and data in their web pages are separated. The transformed web applications can then directly leverage the browser's support for Content Security Policy to avoid the exploitation of cross-site scripting vulnerabilities.

A general approach described herein aims to eliminate server-side cross-site scripting vulnerabilities by separating the code and data in the output (web pages) produced by a web application. The code in a web page includes inline JavaScript® code (that is, JavaScript® in between <script> and </script>), JavaScript® code in HTML attributes (event handlers such as onclick), and Cascading Style Sheet (CSS) styles. A general goal is to statically transform a given web application so that the new version preserves the application semantics but outputs web pages in which the inline code has been moved to external files. These external files are the only code that the browser will execute. Hence, when an attacker manages to inject malicious code into the web page (via any function in the web application that produces output), the browser will refuse to execute the malicious code.

In one or more implementations, there are three general algorithmic steps performed in the code and data separation tool 104. For each web page in the web application, the tool 104 (1) statically determines a conservative approximation of the HTML output of the web application, (2) extracts inline code from the approximated HTML output, and (3) rewrites the application so that inline code is moved to external code files.

For purposes of explanation, one or more running examples are used to describe how the system automatically transforms a web application according to these three general steps. The examples herein are based upon an ASP.NET web form page, however it is understood that the techniques described can be applied to other web application frameworks, such as PHP.

The following listing, Listing 1, shows a simplified ASP.NET Web Form page. Note that everything not in between the <% and %> is output directly to the browser:

Listing 1

```
1    <html >
2        <% Title = " Example ";
3            Username = Request . Params ["name"]; %>
```

Listing 1 -continued

```
4        <head ><tile > <%= Title %></ title ></ head >
5        <body >
6            <script >
7                var username = "<%= Username % >";
8            </ script >
9        </body >
10    </html >
```

Everything between matching <% and %> is C# code (in a way similar to how PHP uses the <?php and ?> tags to separate HTML from PHP code). Note that <%= is used to indicate that the C# code will output a string at that location in the HTML output. In Listing 1, Line 2 sets the title of the page, and Line 3 sets the Username variable to the name parameter sent in the query string. The Username is output to the browser inside a JavaScript® string on Line 7.

Internally, ASP.NET compiles the ASP.NET Web Form page to C#, either when the application is deployed, or on-demand, as the page is accessed. The relevant compiled C# output of Listing 1 is shown in Listing 2.

Listing 2

```
1     void Render ( TextWriter w) {
2         w. Write ("<html >\n ");
3         this . Title = " Example ";
4         this . Username = Request . Params ["name"];
5         w. Write ("\n <head ><tile >");
6         w. Write ( this . Title );
7         w. Write (" </title ></ head >\n <body >\n <
                  script >\n var username = \"");
8         w. Write ( this . Username );
9         w. Write ("\";\ n </ script >\n </body >\n
                  /html >");
10    }
```

Here, the ASP.NET Web Form page has been transformed into an equivalent C# program. The ASP.NET compiler creates a class (not shown in this listing) that represents the ASP.NET Web Form. One method of that class tells the ASP.NET web server how to turn this page into HTML; this is the Render method. The Render method is given a TextWriter object as a parameter. Anything written to this object will be sent in the HTTP response. TextWriter.Write is a method call equivalent to writing to the console in a traditional command-line application. From comparing Listing 1 to Listing 2, it is seen that output not between <% and %> tags is written to the TextWriter object. The code between the <% and %> tags is inlined into the function (Lines 2 and 3), and the code that is between the <%= and %> tags is written to the TextWriter object (Lines 6 and 8). Note the similarity between PHP's echo function and TextWriter.Write. Further note that TextWriter.Write is only one method of a set of methods used to write content to the HTTP response; however, for simplicity and brevity herein, TextWriter.Write is used to represent all possible ways of writing content to the HTTP response.

Figure 2:
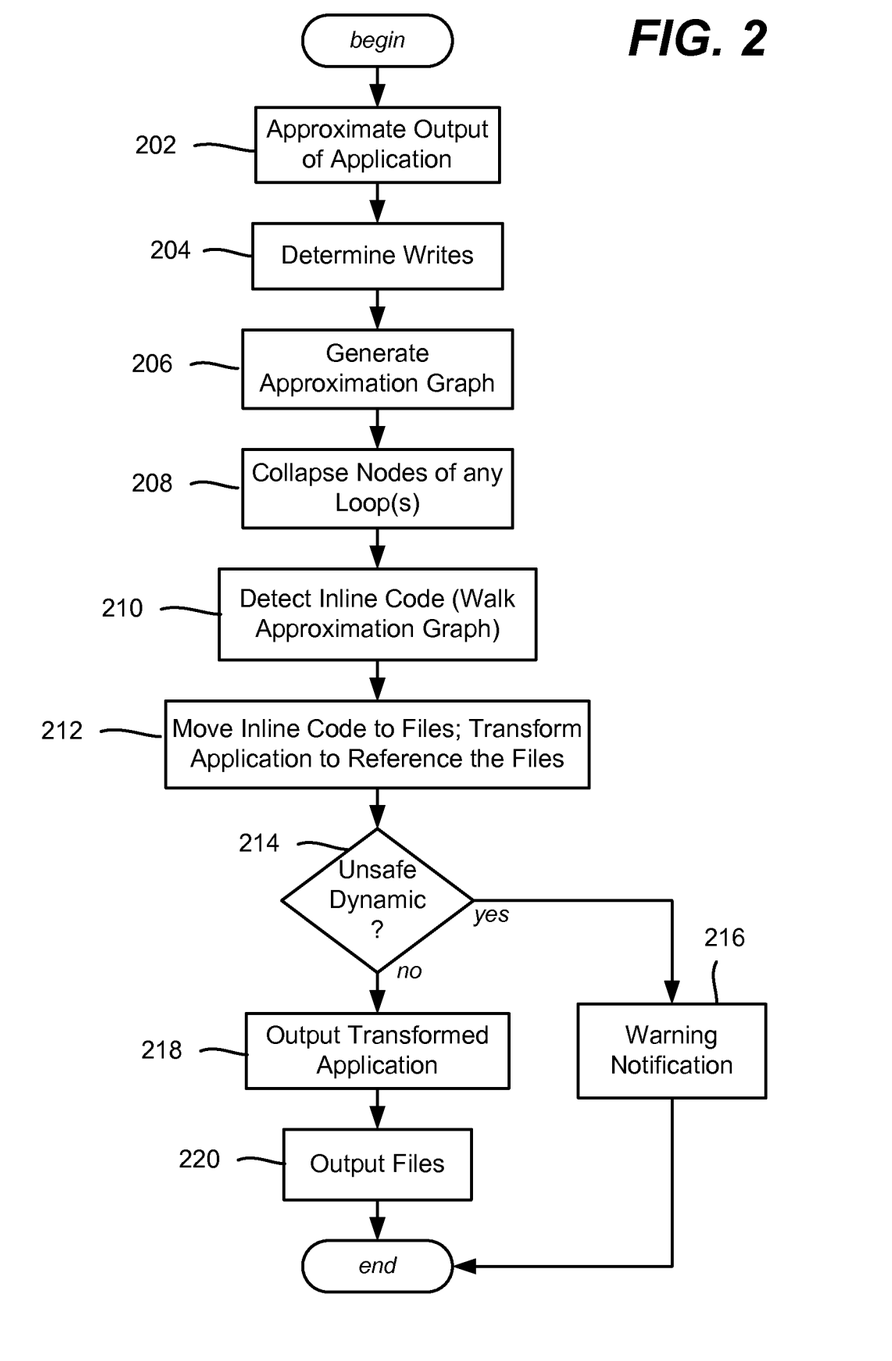
FIG. 2 is a flow diagram representing example steps that may be taken to detect and remove inline code from a web application to transform the application, according to one or more example implementations

FIG. 2 in a flow diagram showing some example steps of the detection and transformation operations. In a first phase, the HTML output of a web page is approximated (step 202). In one or more implementations, approximation is a two-step process. First, as represented by step 204, the tool 104 determines what is being written at every TextWriter.Write location. Second, the tool 104 needs to determine the order in which the TextWriter.Writes can be invoked. A different static analysis technique may be used for these two steps.

To determine what is being written at a TextWriter.Write, in one or more implementations the tool 104 uses a known points-to analysis algorithm (U.S. Published Patent Application No. 20130055207), which is inclusion-based, demand-driven, context-sensitive, field-sensitive, and partially flow-sensitive. The points-to analysis algorithm computes the set of strings that alias with the parameter of TextWriter.Write. If the strings in the alias set are constant strings, the output at the TextWriter.Write is defined as the conjunction of the possible constant strings. Otherwise, the output is statically undecidable.

To determine the ordering of all TextWriter.Write method calls, a control-flow graph is built, using standard techniques; the tool focuses on the TextWriter.Write method calls. The tool encodes the information produced by the two static analyses—the ordering of TextWriter.Write method calls and their possible output—into a graph referred to as an approximation graph (step 206).

Figure 3:
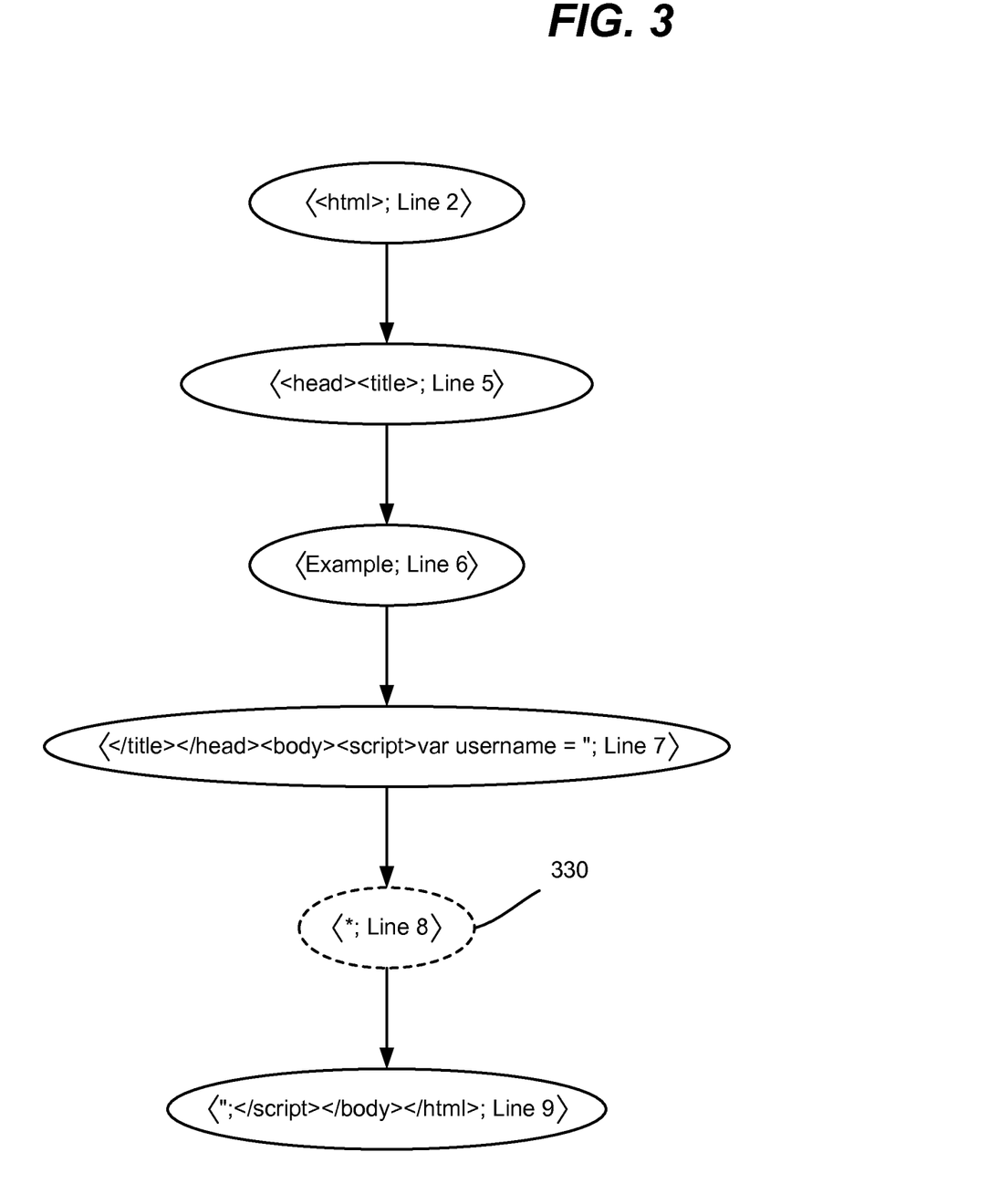
FIGS. 3 and 4 are representations of approximation graphs built to detect inline code, according to one or more example implementations.

FIG. 3 shows the approximation graph for the code in Listing 1 and Listing 2. Each node in the graph contains the location of the TextWriter.Write that this node represents, corresponding to lines 2 and 5-9 in the above listings, as well as the possible constant strings that can be output at this TextWriter.Write location. Content that cannot be determined statically is represented by a wild card * (the dotted node 330 in FIG. 3). The strings that may be output at the TextWriter.Write are used to identify inline code, and the location of the TextWriter.Write is used for rewriting the application, as described herein.

Figure 4:
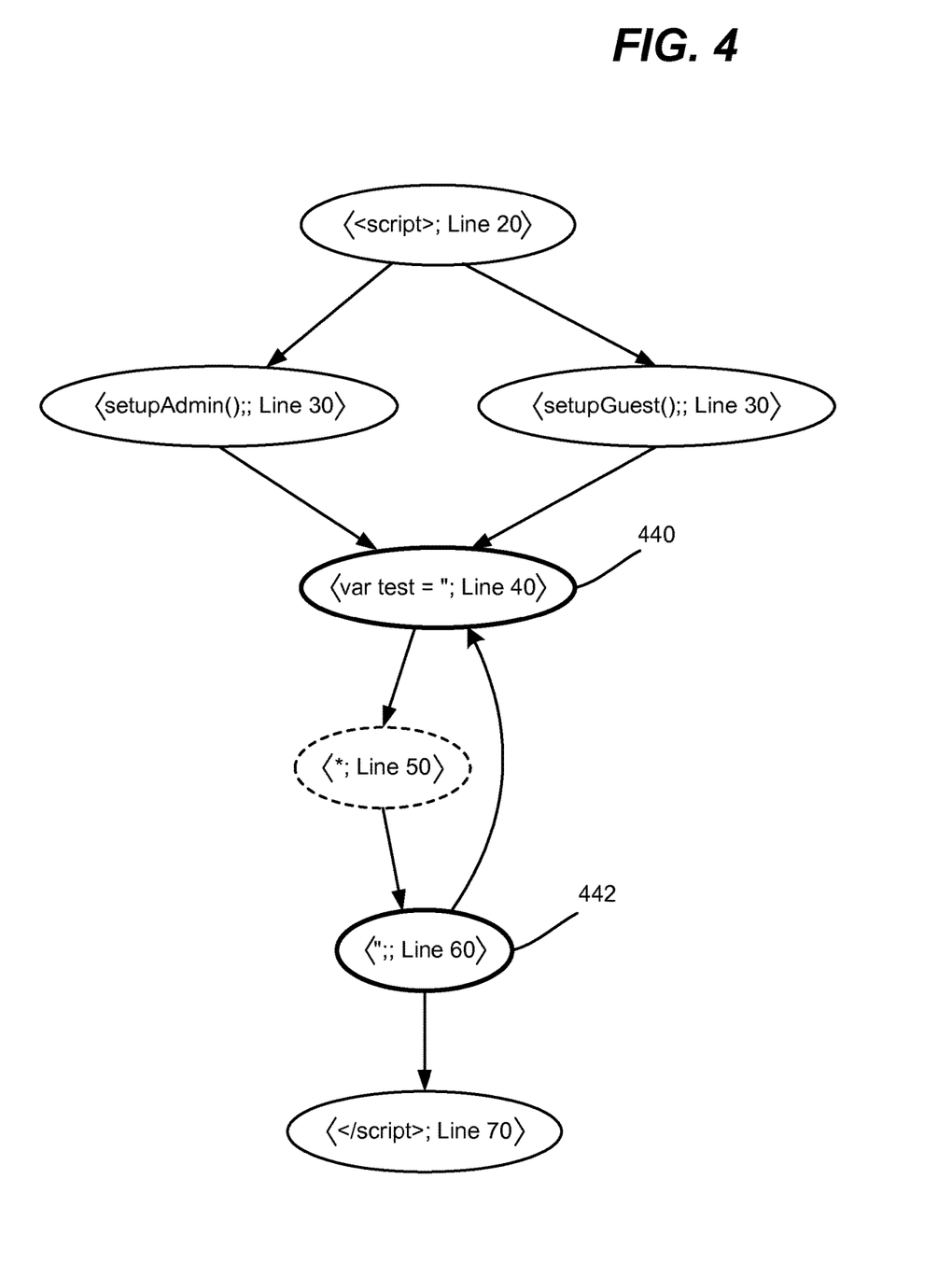

FIG. 4 shows the approximation graph of a more complex page. The graph in FIG. 4 contains a branch, where each node in the branch maps to the same TextWriter.Write method. This can happen when the points-to analysis says that the TextWriter.Write method can output one of multiple strings. The graph in FIG. 4 also contains a loop that includes the nodes 440 and 442.

Because there is no way to statically determine the number of times a loop may execute, to have the analysis be conservative, at step 208 the tool 104 collapses the nodes of a loop (in the approximation graph) into a single node. This new node now has undecidable content (represented by a *). The new node also keeps track of the TextWriter.Write methods that were part of the original loop.

After collapsing any loops in the graph, the tool derives a conservative approximation of the HTML output of a web page. The approximation graph is a directed acyclic graph (DAG).

In a second phase, the tool's algorithm uses the generated approximation graph to extract from the graph the possible inline (e.g., JavaScript®) code; (for purposes of brevity, inline code is sometimes referred to as JavaScript®, although it is understood that other code such as CSS may be handled in generally the same way). The output of this phase is a set containing any inline code that may appear in the web page.

In an approximation graph, each unique path from the start node to the end node represents a potential output of the page. A naïve algorithm may enumerate all paths and, thus, all outputs, and parse each output string to identify inline JavaScript®. However, the number of unique paths even in a simple web page may quickly explode and become unmanageable. To solve the potential path explosion problem, the tool extracts the inline JavaScript® directly from the approximation graph, as generally represented via step 210 of FIG. 2. To this end, the tool searches for the opening and closing tags of HTML elements in the graph, ignoring tags that appear in comments.

For each pair of JavaScript® tags (i.e., <script> and </script>), the tool processes the unique paths between the opening and closing tags. For each such path, the tool obtains a piece of inline JavaScript® that the program may output. At this point, the inline code has been detected.

It should be noted that this information may be used as is, without any rewriting of an application. For example, these pieces of inline code may be given to a developer or the like, who is writing new code or analyzing existing code, to show where inline code exists in a web application. In some scenarios, such as debugging or verifying a new application, this detection and identification may be sufficient. In other scenarios, automatic rewriting of the application is desired.

For rewriting, these identified inline JavaScript® pieces are passed to the next (e.g., last) phase of the tool's algorithm, which decides how to rewrite the application. At this point, the scripts may contain unknown portions (the * parts), the handling of which is described below.

The third general phase exemplified herein, is directed towards rewriting the web application so that the identified inline JavaScript® is removed from the HTML content, and saved in external JavaScript® files. In the HTML code, detected inline JavaScript® is replaced (step 212) with a reference to an external JavaScript® file as follows: <script src="External.js"></script>.

Multiple possible inline JavaScript® snippets may exist between an opening and closing JavaScript® tag, as there may be branches between the tags in the approximation graph. To know which exact inline JavaScript® is created, the execution of the server-side code is tracked.

More particularly, the inline JavaScript® identified in the previous phase falls into two categories, namely static and dynamic (i.e., contains undecidable content). Because the tool cannot statically decide the content of a dynamic inline JavaScript®, the execution of the server-side code to create its external JavaScript® file(s) is tracked at runtime. When there is a single static inline JavaScript® piece of code between a pair of opening and closing script tags, tracking the execution of the server-side code is not needed.

For a pair of opening and closing script tags that need tracking of the execution of the server-side code, the tool rewrites the application as follows: at the TextWriter.Write that outputs the opening script tag, the tool writes out everything before the start of the opening script tag, and removes the opening script tag itself. The remaining content is stored into a session variable that is unique to each opening script tag. Then, for all subsequent TextWriter.Write method calls, except for the last (that writes the closing tag), the tool appends their output to the session variable. For the last TextWriter.Write method call (i.e., the one that writes the closing script tag), any string content that occurs before the closing script tag is appended to the session variable. Any content after the closing script tag is just written to the output. At this point, the session variable contains the entire inline JavaScript® code. This code is saved to an external file, and a TextWriter.Write method call is added that outputs the reference to this JavaScript® file (so that the browser can later load it properly). To support JavaScript® caching on the client side, the name of the JavaScript® is derived from its content, using a cryptographic hash of the script.

Listing 3 shows the result of applying this rewriting process to the inline JavaScript® code in Listing 2. Note that the changes shown are the transformation made to Lines 7-9 in Listing 2.

Listing 3

```
1    w. Write (" </title ></ head >\n <body >\n ");
2    Session ["7"] = "\n var username = \"";
3    Session ["7"] += this . Username ;
4    Session ["7"] += "\";\ n ";
5    var hashName = Hash ( Session ["7"]) + ".js";
6    WriteToFile ( hashName , Session ["7"]);
7    w. Write ("<script src =\"" + hashName + "\"> </script >");
8    w. Write ("\n </body >\n </ html >");
```

Dynamic inline JavaScript® is another issue. More particularly, a JavaScript® file that is built during runtime (dynamic inline JavaScript®, as described above) may contain parts that depend on user input. For example, instead of entering a "name" when asked, an attacker may input "</script><script>[malicious code]</script>" (where [malicious code] represents some actual code).

For dynamic inline JavaScript®, the above-described approach does not guarantee security. In other words, if the statically undecidable content contains untrusted input, and it is not properly sanitized inside the JavaScript® code, an attacker can exploit this bug to inject a malicious script. The technology described herein does not mitigate this attack, as it instead moves the vulnerable JavaScript® to an external file that is executed.

By way of example, consider the example application in Listing 2. There is an XSS vulnerability on Line 8 because the Username variable is derived from the name parameter and output directly to the user, without sanitization. An attacker may exploit this vulnerability by setting the name parameter to ";alert(xss)//. This would cause the resulting inline JavaScript® to be the following, thus executing the attacker's JavaScript® code:

```
<script>
    var username = "";alert(xss)//";
</script>
```

Indeed, the rewritten code in Listing 3 moves this inline JavaScript® to an external JavaScript® file, preserving the vulnerability.

This problem may be addressed by identifying cases in which the tool is able to safely rewrite the application. The tool notifies the developer when making an inline-to-external transformation that is potentially unsafe (steps 214 and 216). If no notifications are needed (or if one or more notifications exist but the developer wants the transformed application anyway), steps 218 and 220 output the transformed application and the files created to contain the script.

Note that when unknown output is produced in certain JavaScript® contexts, it can be included in a safe fashion. Before converting an inline dynamic JavaScript® to an external file, the tool passes it to a JavaScript® parser. Then, the tool queries the parser to determine the contexts in which the unknown parts (the * parts) are used. HTML parsing contexts may include JavaScript® string, JavaScript® regular expression, JavaScript® variable, and so forth. Whenever the tool can determine that the context for an unknown (and potentially unsafe) part is inside a JavaScript® string context, this means that the undetermined output is inside this specific context. If the entire undetermined output appears in the context of a string, the tool can safely rewrite the inline JavaScript® to preserve the JavaScript® context of the dynamic content. That is, any potential XSS vulnerabilities due to the dynamic JavaScript® content are eliminated.

Listing 2 is an example of inline JavaScript® code where the dynamic content is entirely inside a JavaScript® string context. The output of the Username C# variable is contained entirely within a JavaScript® string. In this case, during the rewriting, the entire JavaScript® string is replaced, including the dynamic content, with a JavaScript® function call. This function will return, as a string, the value of the dynamic content. The inline JavaScript® in Listing 2 is rewritten to the following:

```
<script>
    var username = getString1 ( );
</script>
```

The JavaScript® function that returns the dynamic content, in this example getString1, is defined in an external JavaScript® file. The function is constructed such that the dynamic content is safely serialized, on the server-side, to the client-side JavaScript®. The client-side JavaScript®, when called by the original code, then deserializes the dynamic content and returns it as a string. Thus, dynamic content (and an attacker) can never break out of the original JavaScript® context, in this case a string.

Applying this rewriting optimization, Listing 2 becomes Listing 4:

Listing 4

```
1    w. Write (" </title ></ head >\n <body >\n ");
2    Session ["7"] = "\n var username = ";
3    Session ["7"] += " getString1 ( )";
4    Session ["String1"] = this . Username ;
5    Session ["7"] += ";\n ";
6
7    var stringHashName = Hash ( Session ["String1"]) + ".js";
8    var stringOutput =  "     function getString1 ( ) {" +
9                       "         return UrlDecode (\" " + UrlEncode (
                                   Session ["String1"]) + " \");" +
10                      "}";
11   WriteToFile ( stringHashName , stringOutput );
12   w. Write ("<script src =\"" + stringHashName + "\" ></ script
                                   >");
13
14   var hashName = Hash ( Session ["7"]) + ".js";
15   WriteToFile ( hashName , Session ["7"]);
16   w. Write ("<script src =\"" + hashName + "\"> </ script >");
17   w. Write ("\n </body >\n </ html >");
```

As can be seen, Lines 2 and 5 have the opening and closing quotation marks, respectively, removed. At Line 3, the JavaScript® function, getString1, is appended to the session variable in place of the Username variable. The value of the Username variable is stored into a separate session variable (Line 4). Lines 8-10 define the JavaScript® function, getString1, that will deserialize the C# serialized Username variable. More precisely, the UrlEncode(Session ["String1"]) on Line 9 is server-side C# code that will serialize the Username variable. A JavaScript® file containing just this function is stored on Line 11, and an external JavaScript® reference to this file is output on Line 12.

By way of example, consider the output if Listing 4 were given the previously described exploit ";alert(xss)// for the name parameter. The JavaScript® function getString1 is the following:

```
function getString1 ( ) {
    return UrlDecode("%22%3Balert(xss)%2F%2F");
}
```

Therefore the JavaScript® username variable would get the value of ";alert(xss)// and the exploit is nullified.

Note that it is possible that the safe rewriting does not preserve the semantics of the application. This may happen, for example, when the developer intends for the dynamic content to go into multiple JavaScript® contexts. The tool alerts the developer when such a rewriting occurs.

Another aspect to the rewriting of the application is directed to adding guards before each rewriting operation so that the rewriting is only performed when the inline JavaScript® is present. Consider the code in Listing 5, showing example code where inline script and regular HTML can be output at the same TextWriter.Write, which contains one function and two Controls:

Listing 5

```
1    Out ( string str , TextWriter w)
2    {
3        w. Write ( str);
4    }
5
6    Control A
7    Render ( TextWriter w)
8    {
9        Out ("<div >H </ div >", w);
10   }
11
12   Control B
13   Render ( TextWriter w)
14   {
15       Out ("<script > alert (\" W \") ;</ script >", w);
16   }
```

The Render methods in both controls call the out function with different arguments, and the out function in turn simply calls TextWriter.Write on Line 3. The points-to analysis indicates that the TextWriter.Write on Line 3 can output one of two strings: a div element or an inline JavaScript® script. When the tool performs the actual rewriting, the idea is to only rewrite when the str parameter is an inline JavaScript® script, not when the str parameter is a div element. To solve this problem, right before the first TextWriter.Write, (the TextWriter.Write that outputs the starting script tag), the tool checks if the parameter is equal to what is statically determined to be the starting script tag. Then, the result of this check is stored into a flag specific to the location of the first TextWriter.Write. Each rewritten TextWriter.Write consults this flag and performs any rewriting operation only when it is true. The addition of such guards makes the approach conservative in the sense that the tool only rewrites the application when the state of the inputs conforms to what is expected based on the static analysis pass.

The points-to analysis system may be extended to model string concatenation by including special edges into the program graph that indicate that a variable is the result of the concatenation of two other variables. When computing the alias set of a variable, this is done in the original way (ignoring any concatenation edges). Then, for each variable in the alias set that has concatenation edges, the tools compute the alias set for each of the two variables involved in the concatenation operation. The tool concatenates strings in the two alias sets and add them to the original alias set. If one of the variables in the concatenation is undecidable, the original variable also becomes undecidable. This process is recursive, and handles arbitrary levels of concatenation. This technique can also be extended to support other string operations.

In ASP.NET reusable components, called Controls may be used. The idea is that a developer can write a control once and then include it in other pages, and even in other controls. This relationship of including one control in another creates a parent-child relationship between the controls (the parent being the control that contains the child control). More precisely, ASP.NET makes a distinction between general controls and the more specific User Controls.

Figure 5:
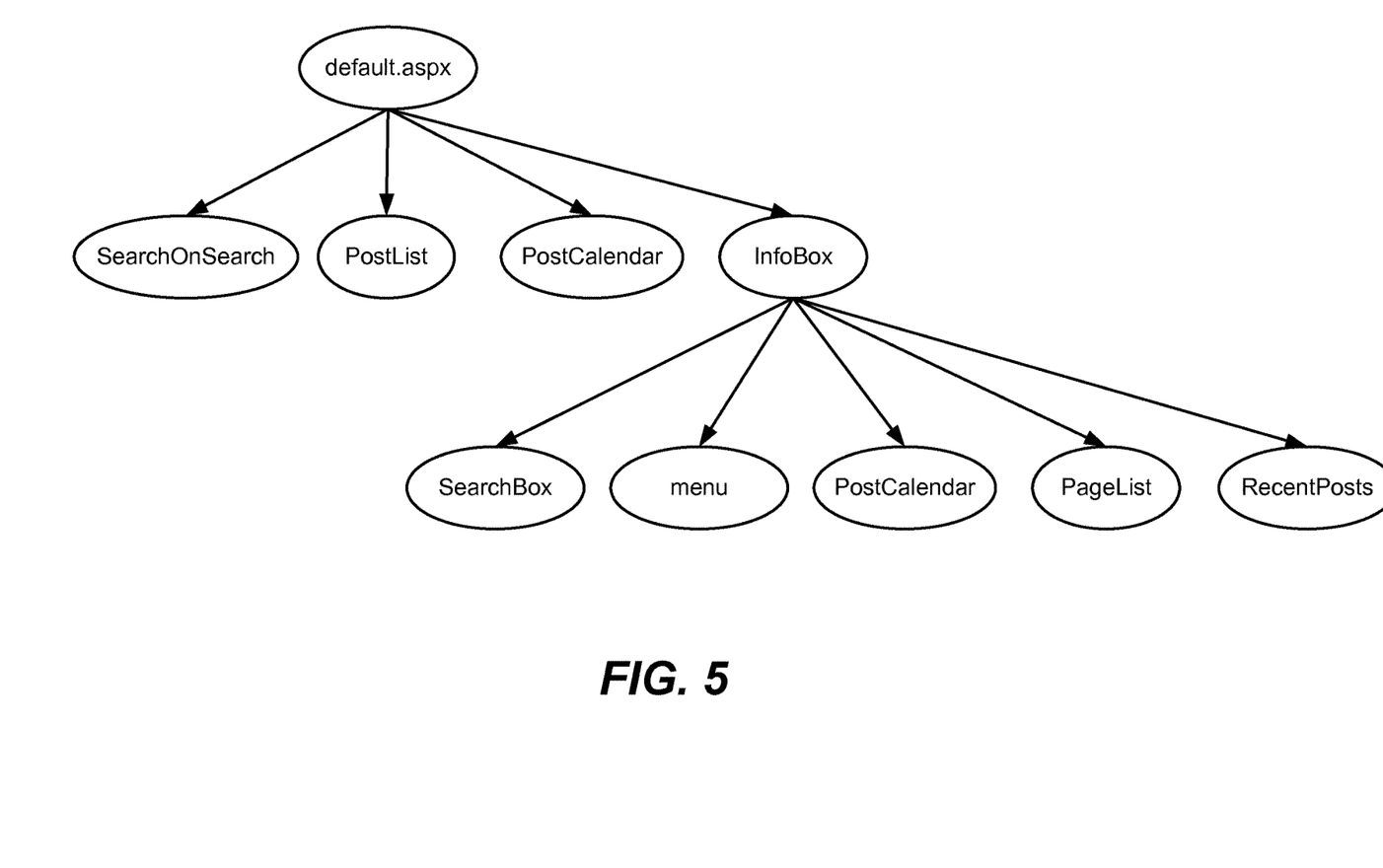
FIG. 5 is a representation of a tree of parent-child control relationships that is used in building a control flow graph, according to one or more example implementations.

In an ASP.NET Web Form page, child controls are first added to the parent's ChildControls collection, which is like an array. Then, during rendering, a parent renders its child controls by iterating over the ChildControls or by referencing a child control based on its index in the ChildControls. Because the points-to analysis does not model the array relation, the tool cannot precisely decide which child Control is being selected during rendering. To handle this problem, the parent-child relationships may be tracked directly. These parent-child relationships form a tree. FIG. 5 shows the parent-child relationship of some of the user controls of default.aspx. When building the control graph, the tool statically recreates this tree.

To create this relationship statically, an approach similar to approximating the HTML output may be taken. The entry function for an ASP.NET page is FrameworkInitialize, which is similar to the main function for a C program. Starting from this method, a control flow graph is created of the calls to AddParsedSubObject, which is the function that adds a child control to a parent. This gives the order of the AddParsedSubObject calls. At each of the calls, the points-to analysis is used to find which control is the parent and which is the child. This information, along with the order of the calls to AddParsedSubObject, allows recreating the parent-child control tree.

Example Networked and Distributed Environments

One of ordinary skill in the art can appreciate that the various embodiments and methods described herein can be implemented in connection with any computer or other client or server device, which can be deployed as part of a computer network or in a distributed computing environment, and can be connected to any kind of data store or stores. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 6:
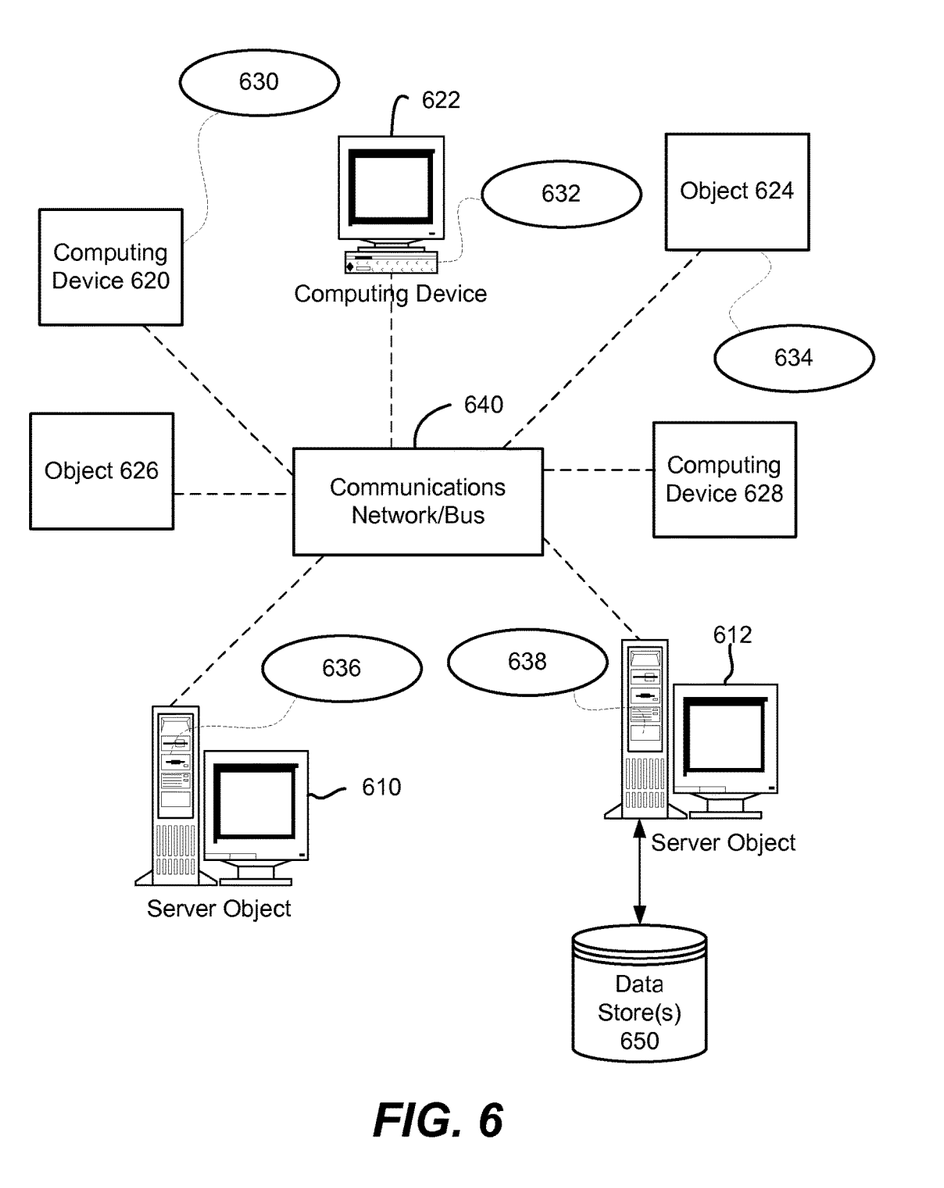
FIG. 6 is a block diagram representing example non-limiting networked environments in which various embodiments described herein can be implemented.

FIG. 6 provides a schematic diagram of an example networked or distributed computing environment. The distributed computing environment comprises computing objects 610, 612, etc., and computing objects or devices 620, 622, 624, 626, 628, etc., which may include programs, methods, data stores, programmable logic, etc. as represented by example applications 630, 632, 634, 636, 638. It can be appreciated that computing objects 610, 612, etc. and computing objects or devices 620, 622, 624, 626, 628, etc. may comprise different devices, such as personal digital assistants (PDAs), audio/video devices, mobile phones, MP3 players, personal computers, laptops, etc.

Each computing object 610, 612, etc. and computing objects or devices 620, 622, 624, 626, 628, etc. can communicate with one or more other computing objects 610, 612, etc. and computing objects or devices 620, 622, 624, 626, 628, etc. by way of the communications network 640, either directly or indirectly. Even though illustrated as a single element in FIG. 6, communications network 640 may comprise other computing objects and computing devices that provide services to the system of FIG. 6, and/or may represent multiple interconnected networks, which are not shown. Each computing object 610, 612, etc. or computing object or device 620, 622, 624, 626, 628, etc. can also contain an application, such as applications 630, 632, 634, 636, 638, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for example communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 6, as a non-limiting example, computing objects or devices 620, 622, 624, 626, 628, etc. can be thought of as clients and computing objects 610, 612, etc. can be thought of as servers where computing objects 610, 612, etc., acting as servers provide data services, such as receiving data from client computing objects or devices 620, 622, 624, 626, 628, etc., storing of data, processing of data, transmitting data to client computing objects or devices 620, 622, 624, 626, 628, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 640 or bus is the Internet, for example, the computing objects 610, 612, etc. can be Web servers with which other computing objects or devices 620, 622, 624, 626, 628, etc. communicate via any of a number of known protocols, such as the hypertext transfer protocol (HTTP). Computing objects 610, 612, etc. acting as servers may also serve as clients, e.g., computing objects or devices 620, 622, 624, 626, 628, etc., as may be characteristic of a distributed computing environment.

Example Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 7 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 7:
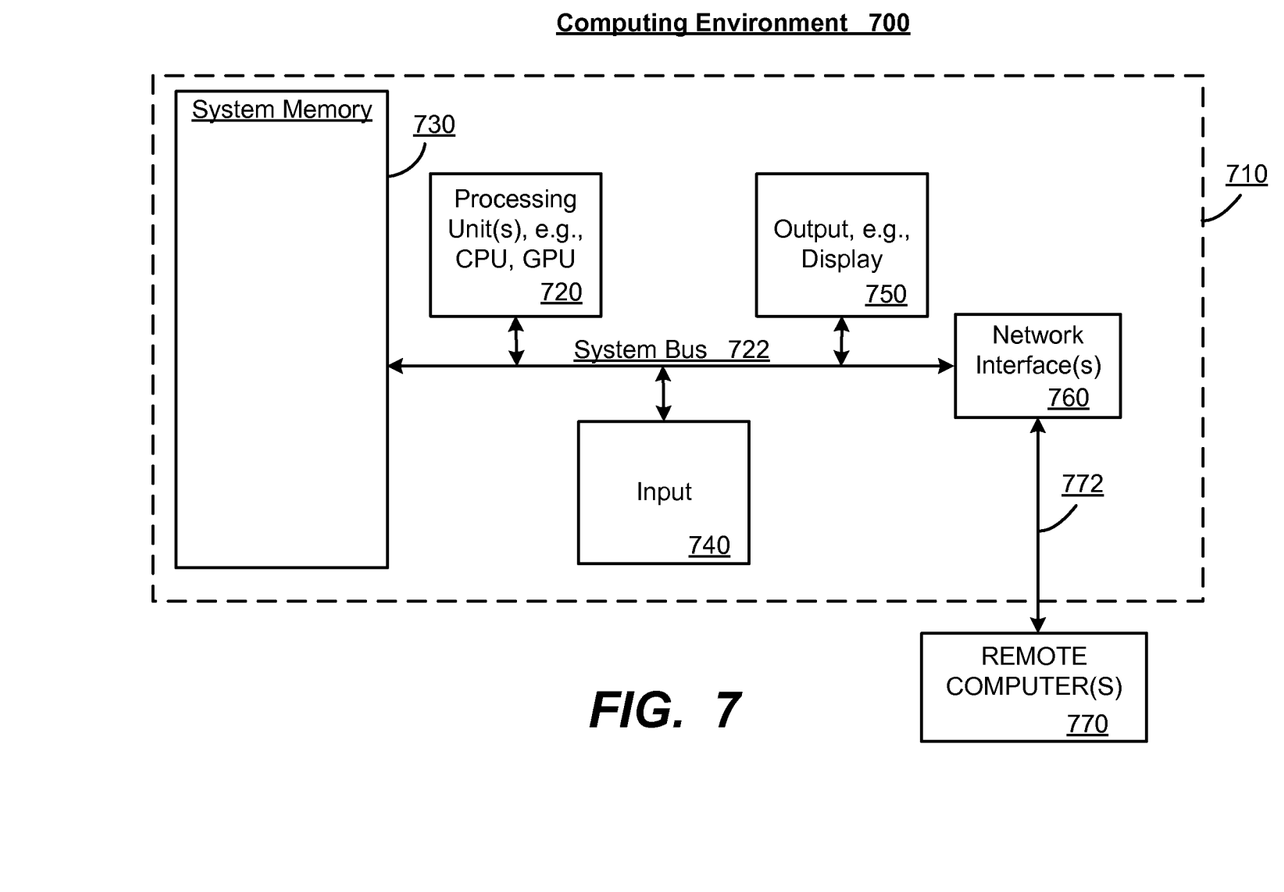
FIG. 7 is a block diagram representing an example non-limiting computing system or operating environment in which one or more aspects of various embodiments described herein can be implemented.

FIG. 7 thus illustrates an example of a suitable computing system environment 700 in which one or aspects of the embodiments described herein can be implemented, although as made clear above, the computing system environment 700 is only one example of a suitable computing environment and is not intended to suggest any limitation as to scope of use or functionality. In addition, the computing system environment 700 is not intended to be interpreted as having any dependency relating to any one or combination of components illustrated in the example computing system environment 700.

With reference to FIG. 7, an example remote device for implementing one or more embodiments includes a general purpose computing device in the form of a computer 710. Components of computer 710 may include, but are not limited to, a processing unit 720, a system memory 730, and a system bus 722 that couples various system components including the system memory to the processing unit 720.

Computer 710 typically includes a variety of computer readable media and can be any available media that can be accessed by computer 710. The system memory 730 may include computer storage media in the form of volatile and/or nonvolatile memory such as read only memory (ROM) and/or random access memory (RAM). By way of example, and not limitation, system memory 730 may also include an operating system, application programs, other program modules, and program data.

A user can enter commands and information into the computer 710 through input devices 740. A monitor or other type of display device is also connected to the system bus 722 via an interface, such as output interface 750. In addition to a monitor, computers can also include other peripheral output devices such as speakers and a printer, which may be connected through output interface 750.

The computer 710 may operate in a networked or distributed environment using logical connections to one or more other remote computers, such as remote computer 770. The remote computer 770 may be a personal computer, a server, a router, a network PC, a peer device or other common network node, or any other remote media consumption or transmission device, and may include any or all of the elements described above relative to the computer 710. The logical connections depicted in FIG. 7 include a network 772, such local area network (LAN) or a wide area network (WAN), but may also include other networks/buses. Such networking environments are commonplace in homes, offices, enterprise-wide computer networks, intranets and the Internet.

As mentioned above, while example embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. A method for analyzing a web application to detect inline code, the method comprising:
   performing data flow analysis of the web application to approximate output of the web application;
   parsing data representative of the approximated output to identify any inline code;
   rewriting the identified inline code to code in external code files;
   transforming the web application into a transformed application that references the code in the external code files;
   enabling execution of the code in the external files referenced by the transformed applications; and
   if inline code is identified in the transformed application, not allowing execution of the identified inline code.

2. The method of claim 1 wherein transforming the web application into the transformed application comprises:
   for at least one instance of detected inline code, moving code corresponding to the inline code to a file; and
   replacing the inline code with a reference to the file.

3. The method of claim 1 wherein transforming the web application into the transformed application comprises configuring the web application for having a file dynamically built at runtime.

4. The method of claim 3 further comprising, determining whether the file dynamically built at runtime is dependent upon undeterminable user input, and if so, determining whether the inline code corresponding to the file is able to be safely rewritten, and if so, rewriting the inline code, and if not, outputting a notification.

5. The method of claim 1 wherein performing the data flow analysis of the web application to approximate the output comprises determining what output is being written and an order at which a set of one or more writing functions are invoked.

6. The method of claim 5 further comprising constructing an approximation graph to represent the output being written and the order at which the set of one or more writing functions are invoked.

7. The method of claim 6 further comprising processing the approximation graph by collapsing at least one set of nodes representative of a loop into a lesser number of nodes.

8. The method of claim 6 wherein parsing the data representative of the approximated output comprises:
   extracting inline code from the approximation graph; and
   searching for opening and closing tags of elements in the graph to obtain the inline code.

9. The method of claim 8 further comprising:
   moving an instance of inline code to a file; and
   rewriting the transformed application to reference the file.

10. The method of claim 9 further comprising adding a guard to rewrite only inline code that is output.

11. The method of claim 1, wherein performing data flow analysis of the web application to approximate output of the web application comprises performing static data flow analysis of the web application to approximate output of the web application.

12. The method of claim 1, wherein performing data flow analysis of the web application to approximate output of the web application comprises performing dynamic data flow analysis of the web application to approximate output of the web application.

13. A system comprising:
   an analysis tool configured to detect inline code in a web application, the tool comprising an algorithm having:
      an approximation phase configured to determine approximated hypertext markup language (HTML) output;
      a detection and extraction phase configured to detect and extract inline code from data corresponding to the approximated HTML output; and
      a rewriting phase configured to:
         rewrite the detected and extracted inline code to code in external code files;

transform the web application into a transformed application that references the external code files;
enable execution of the code in the external files referenced by the transformed application; and
if inline code is identified in the transformed application, not allow execution of the identified inline code.

14. The system of claim 13 wherein the approximation phase is further configured to generate an approximation graph to represent the approximated HTML output.

15. The system of claim 14 wherein the approximation phase is further configured to collapse at least some loop nodes in the approximation graph into a single loop.

16. The system of claim 14 wherein the detection and extraction phase processes the approximation graph to detect and extract the inline code.

17. The system of claim 13 wherein the rewriting phase rewrites the web application to have a file dynamically built at runtime.

18. One or more machine-readable storage devices having executable instructions, which upon execution by one or more processors, cause the one or more processors to perform operations comprising:

receiving a web application containing inline code;
parsing the web application to detect the inline code:
transforming the web application into a transformed web application in which the inline code is moved to external files;
rewriting the inline code to code in the external code files;
enabling execution of the code in the external files referenced by the transformed application; and
if inline code is identified in the transformed application, not allowing execution of the identified inline code.

19. The one or more machine-readable storage devices of claim 18 wherein parsing the web application to detect the inline code comprises generating an approximation graph representing instances in which a set of one or more writing functions are invoked.

20. The one or more machine-readable storage devices of claim 18 having further executable instructions that upon execution by the one or more processors, cause the one or more processors to perform an operation comprising sending policy information to a client in conjunction with the transformed web application, the policy information instructing the client to only execute code in the external files associated with the web application and not execute inline code.

* * * * *